(12) United States Patent
Harlow et al.

(10) Patent No.: US 9,989,166 B2
(45) Date of Patent: Jun. 5, 2018

(54) DIRECTLY COUPLED VALVE ACTUATOR FOR INFLATABLE STRUCTURES

(71) Applicant: Air Cruisers Company, LLC, Wall Township, NJ (US)

(72) Inventors: Andrew Mahlon Harlow, Brick, NJ (US); Robert Host, Morganville, NJ (US)

(73) Assignee: Air Cruisers Company, LLC, Wall Township, NJ (US)

(*) Notice: Subject to any disclaimer, the term of this patent is extended or adjusted under 35 U.S.C. 154(b) by 0 days. days.

(21) Appl. No.: 15/061,088

(22) Filed: Mar. 4, 2016

(65) Prior Publication Data

US 2016/0258547 A1 Sep. 8, 2016

Related U.S. Application Data

(60) Provisional application No. 62/129,238, filed on Mar. 6, 2015.

(51) Int. Cl.

| | |
|---|---|
| *F16K 15/20* | (2006.01) |
| *F16K 31/143* | (2006.01) |
| *B63C 9/01* | (2006.01) |
| *B60C 29/00* | (2006.01) |
| *B64D 25/18* | (2006.01) |
| *B64D 25/14* | (2006.01) |

(52) U.S. Cl.
CPC ............ *F16K 31/143* (2013.01); *B63C 9/01* (2013.01); *B63C 9/24* (2013.01); *B64D 25/14* (2013.01); *B64D 25/18* (2013.01); *Y10T 137/0396* (2015.04); *Y10T 137/3584* (2015.04); *Y10T 137/3724* (2015.04)

(58) Field of Classification Search
CPC .......... F16K 31/143; B63C 9/01; B63C 9/24; B64D 25/14; B64D 25/18; Y10T 137/3584; Y10T 137/3724; Y10T 137/0318–137/053
USPC .......... 137/223, 231; 251/128, 291, 294, 90, 251/63.4, 293; 441/40–42; 244/137.1, 244/137.2, 905
See application file for complete search history.

(56) References Cited

U.S. PATENT DOCUMENTS

| | | | | |
|---|---|---|---|---|
| 1,779,838 | A * | 10/1930 | Baxter | ............... G10K 5/00 |
| | | | | 251/14 |
| 4,498,604 | A * | 2/1985 | Mackal | ............... B63C 9/24 |
| | | | | 141/329 |
| 6,644,596 | B1 * | 11/2003 | Jurlina | ............... B64D 25/14 |
| | | | | 244/137.1 |
| 7,434,600 | B1 | 10/2008 | Swierkocki et al. | |
| 7,644,739 | B1 | 1/2010 | Vezzosi et al. | |
| 8,794,484 | B2 | 8/2014 | Vezzosi | |

(Continued)

*Primary Examiner* — Craig J Price
(74) *Attorney, Agent, or Firm* — Kilpatrick Townsend & Stockton LLP; Dean W. Russell; Kristin M. Crall (57) ABSTRACT

Embodiments provide systems and methods for an actuating system for inflating an inflatable structure in which a pressurized fluid piston is coupled directly to the valve an inflatable structure. The coupling of actuator to valve is such that the pairing will remain rigid and secure until the deliberate act of operating the actuator. When the actuator is operated, the actuator displaces a translating chock. This activation simultaneously (a) decouples the valve from actuator, allowing the inflatable to deploy without impedance and (b) activates the inflation of the structure via the valve.

11 Claims, 10 Drawing Sheets

(56) References Cited

U.S. PATENT DOCUMENTS 9,067,659 B2 6/2015 Harlow
2006/0144441 A1* 7/2006 Acosta ................ F16K 11/0716
137/223

* cited by examiner

DIRECTLY COUPLED VALVE ACTUATOR FOR INFLATABLE STRUCTURES

CROSS REFERENCE TO RELATED APPLICATIONS

This application claims the benefit of U.S. Provisional Application Ser. No. 62/129,238, filed Mar. 6, 2015, titled "Directly Coupled Valve Actuator Principally for Inflatable Structures," the entire contents of which are hereby incorporated by reference.

FIELD OF THE DISCLOSURE

Embodiments of the present disclosure relate generally to valve actuators for inflatable structures. Specific embodiments may find particular use in connection with inflation of emergency evacuation and/or flotation apparatus intended for use with aircraft. The valve actuators allow the source of fluid that drives activation of the valve actuator to be decoupled from the valve of the inflatable structure itself, as well as all other downstream components.

BACKGROUND

Many aircraft carry emergency flotation devices should they cease flying while over water. Such flotation devices may include life rafts for passengers and crew, evacuation slides, as well as floats for the aircraft itself. These inflatable structures are deployed by actuation systems in which pressurized fluid is used to initiate rapid deployment of the inflatable structure. In cases where inflatable structures are installed in compartments and remote activation is advantageous or preferable, use of pressurized fluids to convey activation fluid may be employed. Under these circumstances, the mechanical energy transmitted from the control as fluid pressure will typically be converted to linear mechanical motion at the interface of the valve. This is accomplished by a piston of some type located near or adjacent to the inflatable structure's valve. The piston can, in turn, apply tension to the valve's mechanical pull cable to initiate inflation.

One disadvantage to such an arrangement is that care must be taken to prevent independent motion between the piston and valve. Ordinarily, if the valve moves away from the actuator (or vice versa), the inflation may be triggered inadvertently. Furthermore, the piston, which is typically permanently connected to the tubing which acts as a conduit for the pressurized fluid, must often remain attached in some form to the aircraft or primary structure. When the inflatable structure is a life raft that must eventually depart from the compartment but remain connected to its source of inflation fluid, the valve actuator cannot remain with the primary compartment structure.

One solution has been to explore electrical actuators. However, electrical actuators, although generally effective, can create challenges for airlines and/or helicopter operators when maintenance or repairs are needed. Mechanically trained technicians are usually on staff, but electrical trained specialists may not be as prevalent. If an electrical valve actuator needs repair, it can be more expensive and more time-consuming. Accordingly, mechanical valves are generally preferable.

Additionally, prior deployment systems for helicopter floats (which do not detach from the structure) are inoperable in their current form for life rafts, which must detach from the structure. It is thus desirable to develop a way to maintain positioning between the valve and piston, such that the positioning between the components allows detachment when the inflatable structure departs the aircraft. The positioning should be secure, such that aircraft vibrations do not accidentally trigger activation.

In previous attempts, a substantial amount of supporting structure has been required to maintain appropriate positioning of the valve and piston. This results in a rigid mounting structure for the piston and rigid guides that maintain the position of the inflation system valve until the deployment is initiated. Without such support systems, struts, or cradling, the system would potentially detach when not intended. However, the presence of such mounting structures adds expense and complexity to the valve system.

The present inventors have identified a need to improve upon these arrangements. The present disclosure thus provides a valve actuator that completely decouples from the inflatable structure valve. The present disclosure provides this decoupling in a way that eliminates the need for these supporting structures. The present disclosure also provides designs that seek to reduce weight, cost, and bulk of current actuator systems.

BRIEF SUMMARY

Embodiments provide systems and methods for an actuating system for inflating an inflatable structure in which a pressurized fluid piston is coupled directly to the valve of an inflatable structure. The coupling of actuator to valve is such that the pairing will remain rigid and secure until the deliberate act of operating the actuator. When the actuator is operated, the actuator displaces a translating chock. This activation simultaneously (a) decouples the valve from actuator, allowing the inflatable to deploy without impedance and (b) activates the inflation of the structure via the valve.

In some embodiments, there is provided a valve actuator, comprising an actuator fluid inlet, an actuator housing, a piston positioned within the actuator housing and capable of slidable movement within the housing upon application of pressurized fluid to the actuator fluid inlet, a translating chock operably associated with the piston, such that translation of the piston causes corresponding translation of the translating chock, wherein the translating chock further comprises an end configured to cooperate with and secure with respect to a valve of an inflatable structure and release from the valve of the inflatable structure when translated.

There may be a manual activation system associated with the chock. The piston may have a piston end comprising a tip and a shoulder, and the chock may have an opening that receives the piston tip. One or more stops to limit dislocation of the translating chock from the actuator housing may be provided. Pressurized fluid tubing may fluidly couple the valve actuator with a pressurized fluid cartridge.

Other embodiments may provide a valve actuator, comprising an element that secures a valve actuator housing to a valve of an inflatable structure, wherein the element comprises a first secured position in which the valve actuator and the valve of the inflatable structure are rigidly secured, wherein the element comprises a second position in which the valve actuator and the valve of the inflatable structure are detached, the second position further causing inflation of the inflatable structure.

Further embodiments may provide a method for inflating a life raft or other inflatable structure to be removed from its activation source, comprising:

providing an element that secures a valve actuator housing to a valve of an inflatable structure, wherein the element comprises a first secured position in which the valve actuator and the valve of the inflatable structure are rigidly secured and a second position in which the valve actuator and the valve of the inflatable structure are detached, the second position further causing inflation of the inflatable structure; and activating the valve actuator, such that the element moves to the second position, detaching the valve actuator from the valve of the inflatable structure and causing inflation of the inflatable structure.

DETAILED DESCRIPTION

Embodiments of the present invention provide a solution to the problem of pneumatically activated inflatable structures that require substantial supporting structures to maintain alignment between the actuator piston and the inflatable structure's inflation valve. The system includes at least one source of pressurized fluid for deploying an inflatable structure and a directly coupled valve actuator that remains rigidly attached to the inflation valve until activation of a translating chock. The translating chock may be activated by the movement of a piston actuated by a pressurized fluid. In a backup situation, the translating chock may be activated manually. Once the translating chock is activated, the valve actuator is physically released from the inflatable structure valve. A separate pressurized fluid reservoir associated with the life raft or other inflatable structure then flows through the valve of the inflatable structure, causing inflation of the life raft. Release of the actuator from the valve causes inflation to begin. A further aspect disclosed relates to methods for inflating inflatable structures using the systems described herein.

Figure 1:
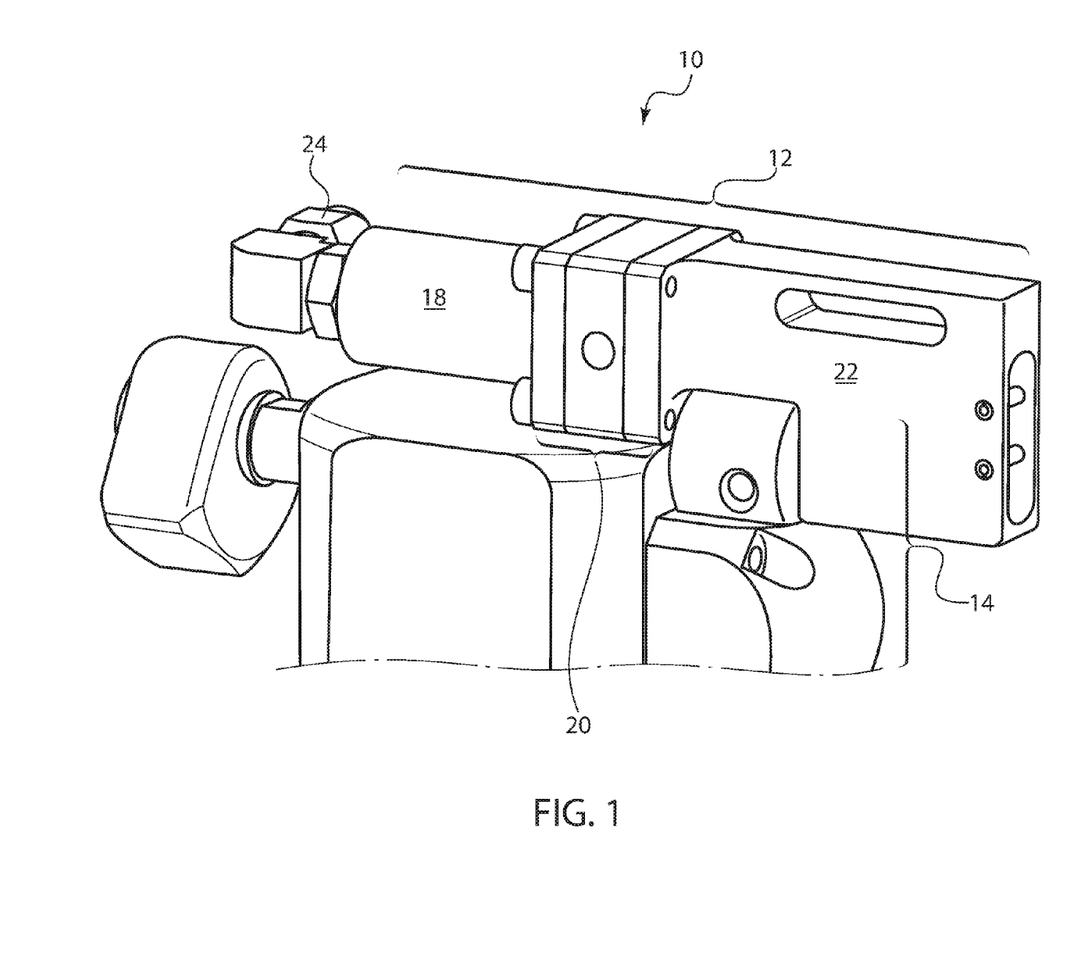
FIG. 1 shows a side perspective view of one example of a valve actuator system.
Figure 2:
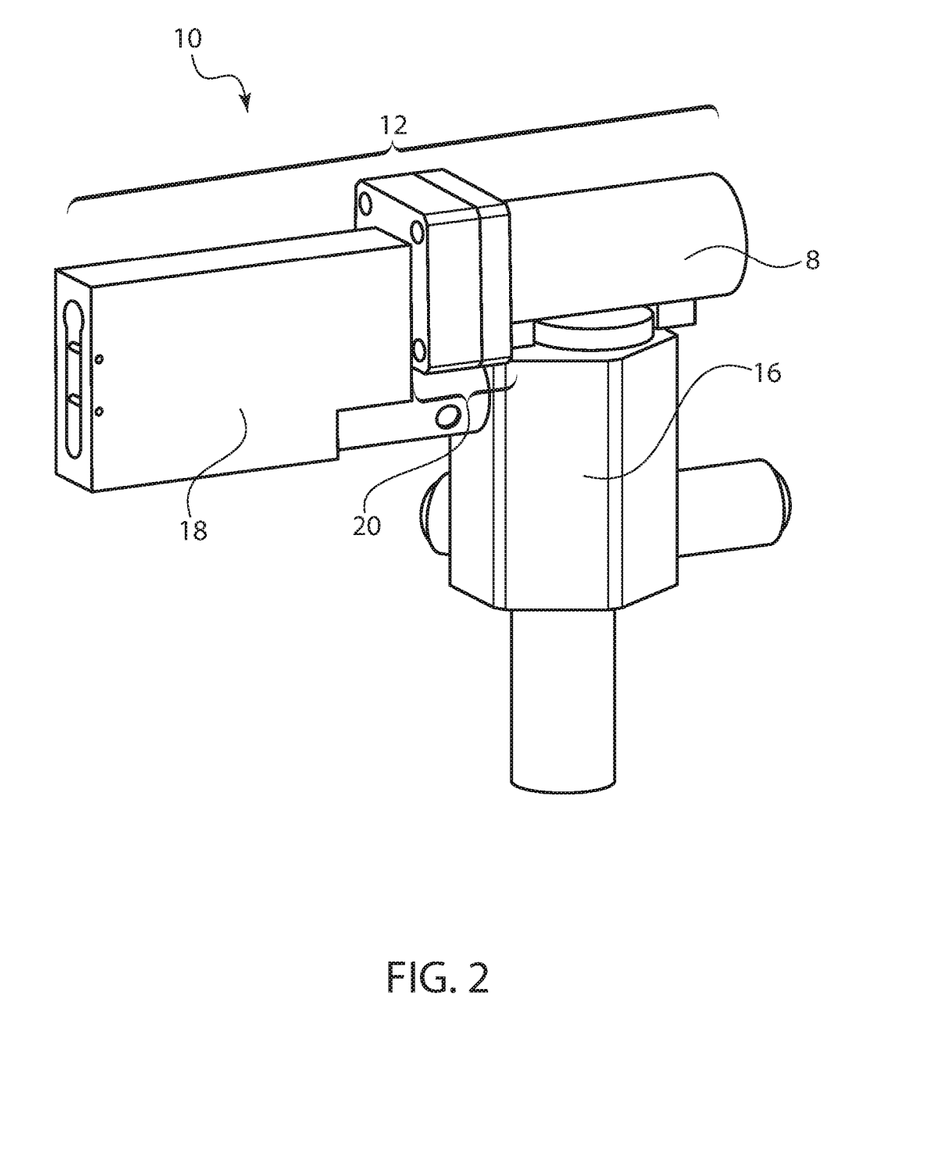
FIG. 2 shows a side perspective view of an alternate valve actuator system used with an alternate valve.

The disclosed embodiments may find particular use in connection with actuated valves for use with inflatables on board aircraft, but it should be understood that other alternatives are possible. FIG. 1 shows a perspective view of an assembled actuator system 10 that uses a directly coupled valve actuator 12 to interface with an inflatable structure valve 14. FIG. 2 shows a valve actuator 12 interfaced with an alternate valve 16. It should be understood that other valve styles and shapes may be used. For example, this disclosure may be used with a ball valve, a poppet valve, a cutter valve (or bayonet or zero leak valve), an inflator valve, or any other appropriate valve that is used on an inflatable structure. The embodiments in these figures illustrate the flexibility of the disclosed system 10. The primary features and shapes may be changed based on the valve shape. For example, FIGS. 1 and 2 provide systems that have differently shaped translating chocks 28 and primary actuator housings 22, both of which are detailed further below.

Referring now to FIG. 1, the actuator system 10 cooperates with a valve 14 of an inflatable structure (the inflatable structure is not shown). The system 10 features a directly coupled valve actuator 12. The valve actuator 12 has an actuation fluid inlet 18, a piston housing 20, and an actuator housing 22. The fluid inlet 18 may be fitted with a shaped or angled element 24 that can cooperate with pneumatic tubing. The pneumatic tubing can be used to deliver pressurized fluid in order to active the piston, as described further below.

Figure 3A:
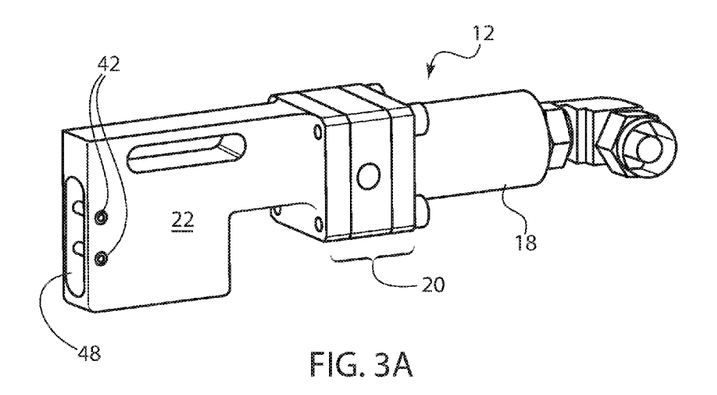
FIG. 3A shows a side perspective view of the system of FIG. 1 released from the valve.
Figure 3B:
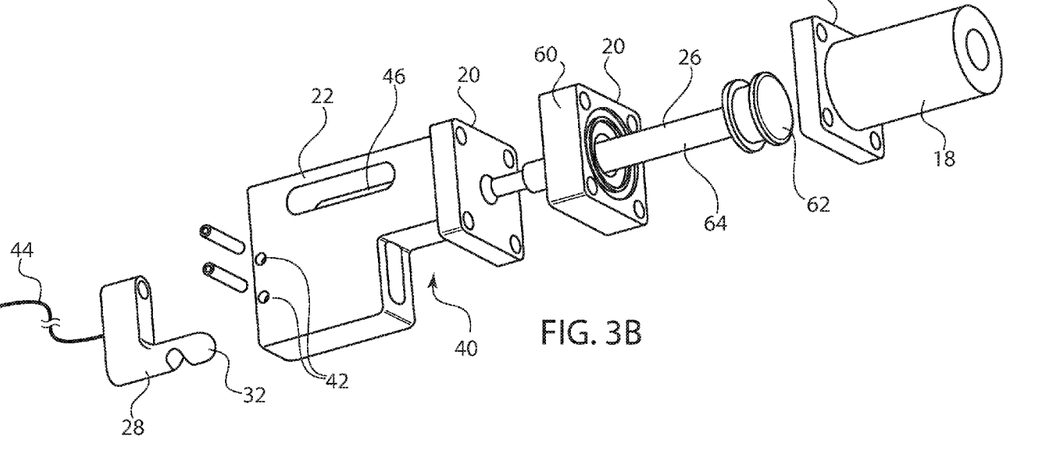
FIG. 3B shows an exploded view of the system of FIG. 3A.
Figures 4A, 4B:
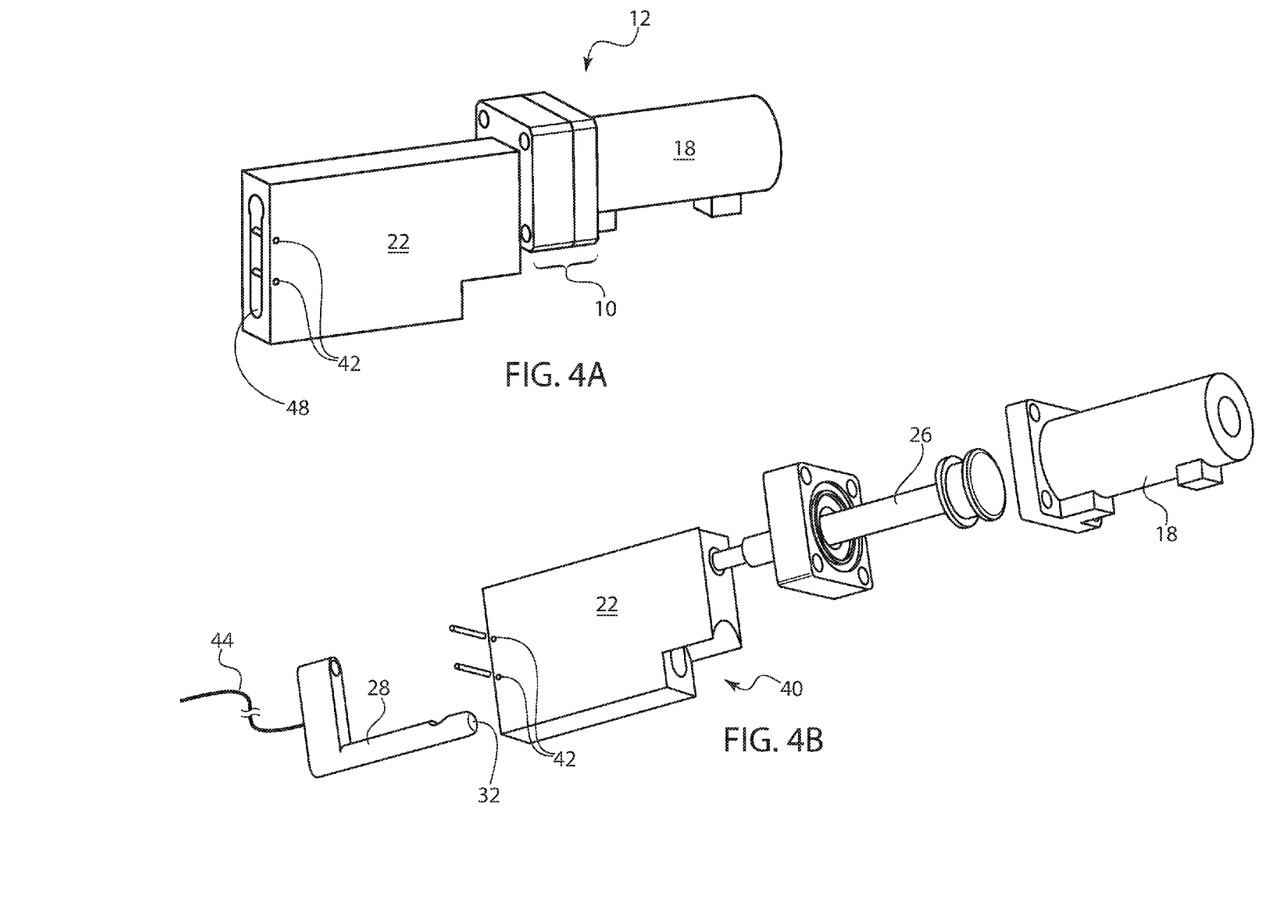
FIG. 4A shows a side perspective view of the system of FIG. 2 released from the valve.
FIG. 4B shows an exploded view of the system of FIG. 4A.

FIGS. 3A and 3B show an assembled and exploded view of the system of FIG. 1. FIGS. 4A and 4B show an assembled and exploded view of the system of FIG. 2. Like elements are given like reference numerals, even when their shapes are varied, depending upon the specific valve shape to which the actuator 12 is fitted. As shown by the exploded views 3B and 4B, a piston rod 26 is positioned within the actuator housing 22. A translating chock 28 is also positioned within the actuator housing 22. The piston rod 26 and the translating chock 28 are generally provided in slidable cooperation.

Figure 8:
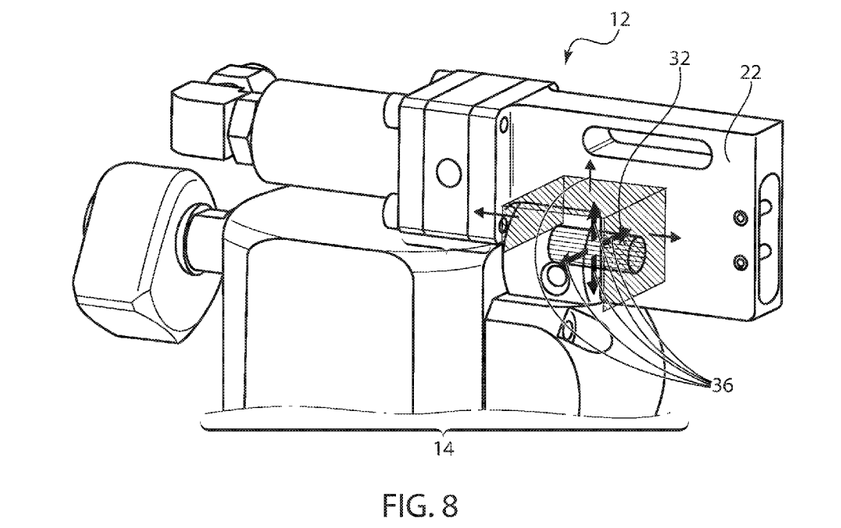
FIG. 8 shows a cross-sectional view of how the chock of the actuator is maintained in a stable configuration without multiple degrees of freedom for movement.

Referring now to each part more specifically, the actuator housing 22 generally has a valve cooperation face 40. This face 40 abuts with the inflatable structure valve 14. As illustrated by FIG. 8, one end 32 of the chock may extend past the valve cooperation face 40 such that it is effectively "pinned" in place with respect to the valve. This prevents movement between the valve 14 and the actuator 12 in the directions indicated by all the arrows in FIG. 8 due to contact surfaces of the actuator 12—at least until the translating chock 28 is translated. As described in more detail below, when the chock 28 is translated/moved as described in shown by FIG. 9, movement is allowed in the directions illustrated by arrows 34, but not in the direction illustrated by arrows 36.

Referring now back to FIGS. 1-4, the housing 22 may also have one or more stops 42. The stops 42 may be included to prevent the chock 28 from becoming separated from the actuator housing 22 when acted upon by the actuator piston 26 or by a manual backup tether 44. Exemplary stops 42 may be pin stops, a back wall, a small opening in the housing that would not allow passage of the chock, or any other appropriate barrier. If provided as pin stops as shown, the stops 42 may extend through the housing 22 in order to provide a backstop to secure chock 28 in place within the housing 22 or to at least partially limit motion of the chock. The figures illustrate pin stops 42 extending across an open end 48 of the housing 22.

A manual backup tether, cable, or pull cord 44 (as shown), or a handle, T-bar, or any other appropriate manual activation system may optionally be included to allow for the inflatable structure to be inflated should the primary means of activation become unavailable. For example, the chock 28 may be activated by the manual pull feature tether 44 in the event that pneumatic or pressurized fluid inflation fails. An optional attachment slot 46 may also be included as a way to partially restrain and control the motion of the actuator during deployment. The slot 46 can effectively act as a belt loop. Slot 46 may act as a point of attachment to keep the system from moving. The slot 46 may employ webbing or other means to act as a flexible attachment to the compartment wall.

The housing 22 helps support at least a portion of the actuator piston 26. The actuator piston 26 may be housed at least in part by the actuator housing 22 and extend through and be secured with respect to a piston housing 20. In the examples shown, the piston housing 20 may include a first piston housing element 60 that cooperates with one end of the actuation fluid inlet 18 and one end of the actuator housing 22 to complete the piston housing 20. The actuator piston 26 is shown having a piston head 62 and a piston rod 64. One or more seals may be present in the piston housing 20 in order to help secure the piston in place and to allow its ease of movement.

The translating chock 28 is shown as having a generally L-shaped body. The chock end 32 is a shaped to cooperate with a corresponding feature 38 on the valve 16. The corresponding feature 38 may be provided as an internal groove that would typically cooperate with a lock pin/safety pin used to prevent inadvertent actuation during maintenance or initial assembly. The chock 28 also has an opening 30 which is shaped to receive piston tip 70.

In general, the actuator piston 26 has geometry and features that allow it to remain rigidly attached within the actuator housing 22 such that it is not separable by common potential factors of inertial loads, shocks, or vibrations. The chock 28 is similarly positioned within the actuator housing 22 such that it is also not separable from the housing 22. Once the valve actuator 12 is positioned with respect to the valve 14, the cooperation between the valve 14 and the actuator 12 are such that the overall assembly/components remains rigidly connected.

The actuator piston 26 is secured with respect to the housing and cooperates in sliding relationship with the translating chock 28. The chock 28 similarly has geometry and features that cause it to remain rigidly attached to the inflatable structure inflation valve 14/16 until such time as it is forced to translate away therefrom. Movement of the chock initiates valve inflation.

Figure 5:
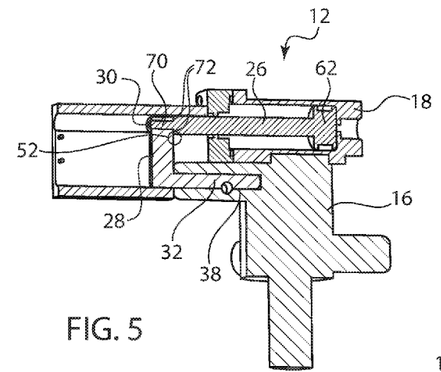
FIG. 5 shows a side cross-sectional view of valve system prior to actuation.
Figure 6:
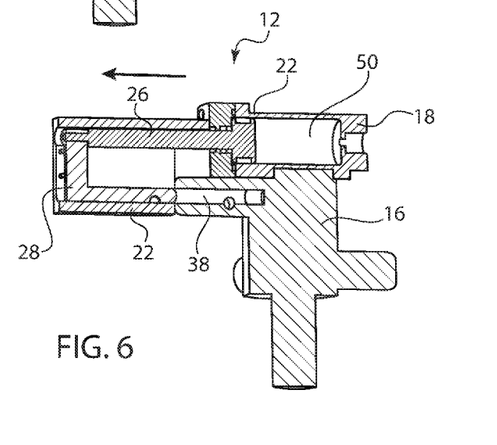
FIG. 6 shows a side cross-sectional view of the valve system of FIG. 5 upon actuation of the piston.

As illustrated by FIGS. 5 and 6, in use, pressurized fluid enters the actuator housing 22 through its attachment to a flexible pneumatic tubing (not shown) at the actuation fluid inlet 18. Pressure from the incoming fluid causes the actuator piston 26 to be displaced. As illustrated by FIG. 5, when the valve actuator 12 is not activated, the piston head 62 is positioned in a first position—against the fluid inlet 18. As illustrated by FIG. 6, when a pressurized fluid supply enters the inlet 18, the piston 26 is forced to move away from the fluid inlet 18. FIG. 6 illustrates the piston 26 moving within a chamber 50 formed within the housing 22. This piston movement, in turn, forces the translating chock 28 to also translate within the housing 22. This translation causes the piston/chock to move to a second position. This movement is illustrated by the arrow on FIG. 6.

Movement of the piston 26 forces related of movement of the chock 28 due to their slidable relationship with respect to one another. In a specific embodiment shown, the piston tip 70 is positioned within the opening 30 of chock 28. Shoulders 72 on the piston abut the wall portions 52 of the chock immediately adjacent to the opening 30. Force on the actuator piston 26 creates consequent force on the chock 28. As shown by FIG. 6, when the chock end 28 has been translated away from the valve feature 38, it releases connection of the actuator valve 12 with respect to the valve 16. Upon completion of travel of the translating chock 28, the valve 16 is decoupled from the actuation system 10 and is free to separate. There is no further coupling left between the valve actuator 12 and the valve 14/16 of the inflatable structure. This can allow the valve 14/16 (and the inflatable structure to which it is connected) to fully disengage from the valve actuator 12. Once disengaged, the inflatable structure has a separate, dedicated inflation source. Movement of the chock thus causes separation of the valve actuator 12 from the valve and simultaneous activation of the inflatable's inflation source.

Figure 10:
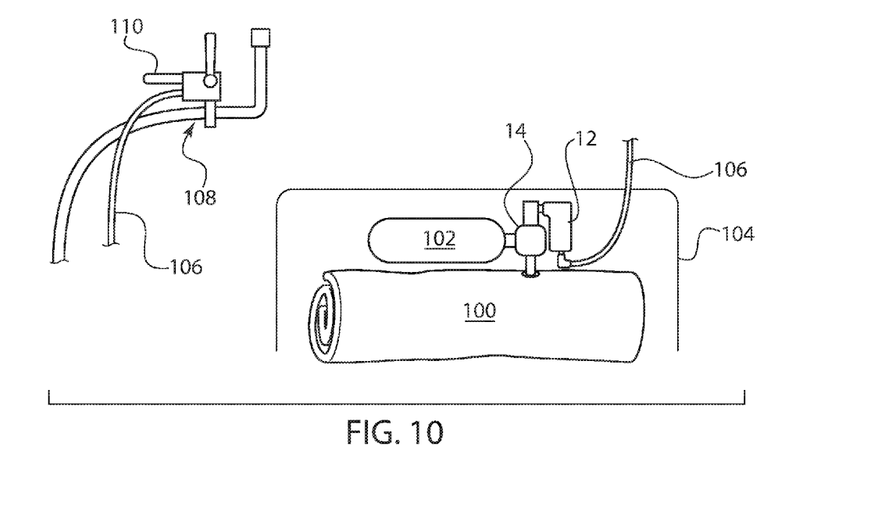
FIG. 10 illustrates an inflatable structure and its associated inflation systems.

As illustrated by FIG. 10, the valve actuator 12 is directly coupled to the valve 14 of the inflatable structure 100. The inflatable structure 100 has a pressurized fluid reservoir 102 that is used for inflation. The inflatable structure 100, along with its reservoir 102 and the directly coupled valve actuator 12, are stored in a rigid enclosure or in a flexible (e.g., fabric) container or case 104. Pneumatic tubing 106 may extend from the valve actuator 12 and cooperates with a pneumatic (or pressurized fluid) activation system 108. One element of the activation system 108 may be a pressurized fluid cartridge 110. The pressurized fluid cartridge may contain compressed $CO_2$. Another element of the activation system 108 may be an activation system handle.

Figure 11:
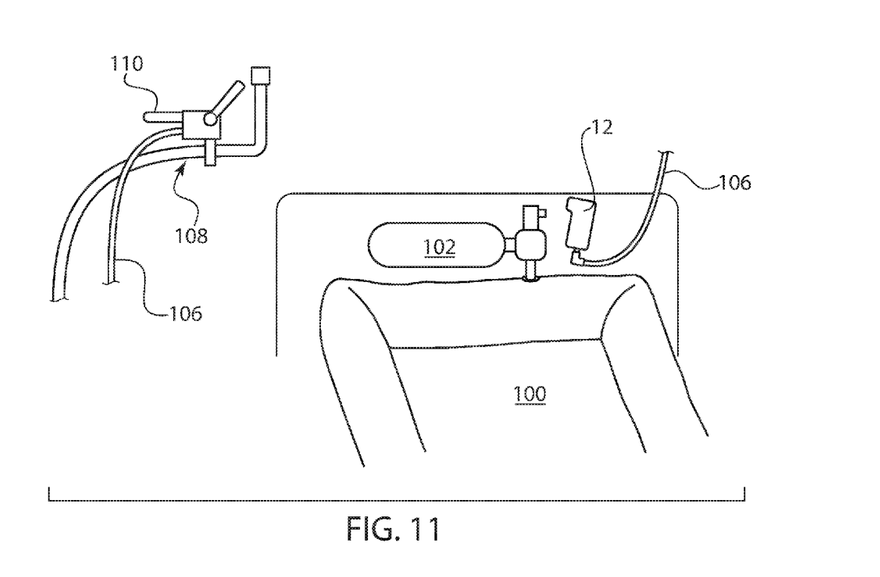
FIG. 11 illustrates inflation of the inflatable structure and its detachment from the valve actuator and aircraft.

When deployment of the inflatable structure 100 is required, the activation system 108 may be activated in any appropriate manner. For example, it may be activated by a pilot or other crewmember. For example, it may be activated automatically via an accelerometer or crash sensor system. It may be activated by a water sensor, a system that uses the presence of water as an indicator to activate, or any other appropriate activation system. Activation of the activation system 108 generally causes the pressurized fluid cartridge 110 to release pressurized fluid into pneumatic tubing 106 which is delivered to the valve actuator 12. As the pressurized fluid is delivered to the actuator fluid inlet 18 as described above, the actuator piston 26 is activated, forcing translation of the translating chock 28. This causes the valve actuator 12 to become unpinned from the valve 14 and triggers inflation of the inflatable structure 100. The valve actuator 12 and the pneumatic tubing 106 stay associated with the aircraft. The inflatable structure 100 with its fluid reservoir 102 begins to inflate and can detach from the aircraft, as shown by FIG. 11.

Figure 12:
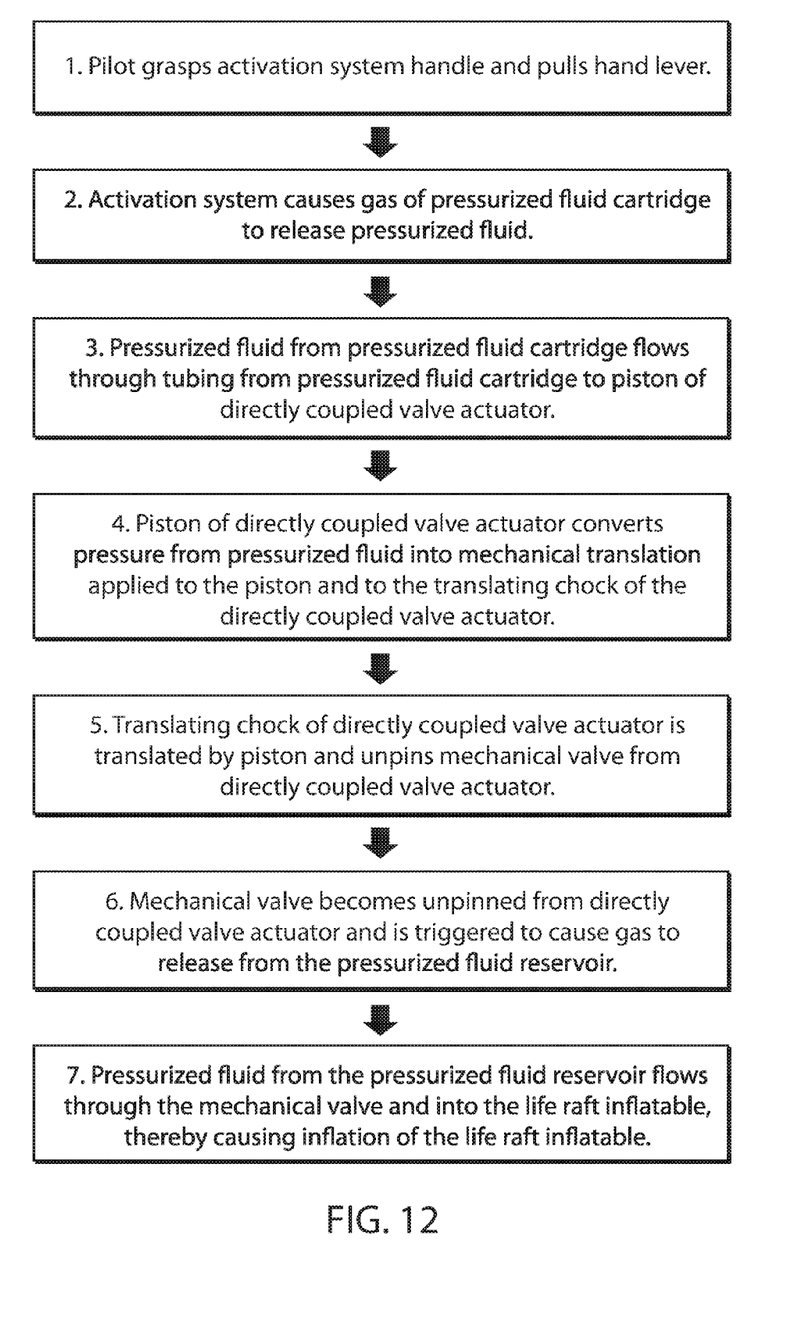
FIG. 12 provides detail of each step outlined by FIGS. 13 and 14.
Figure 13:
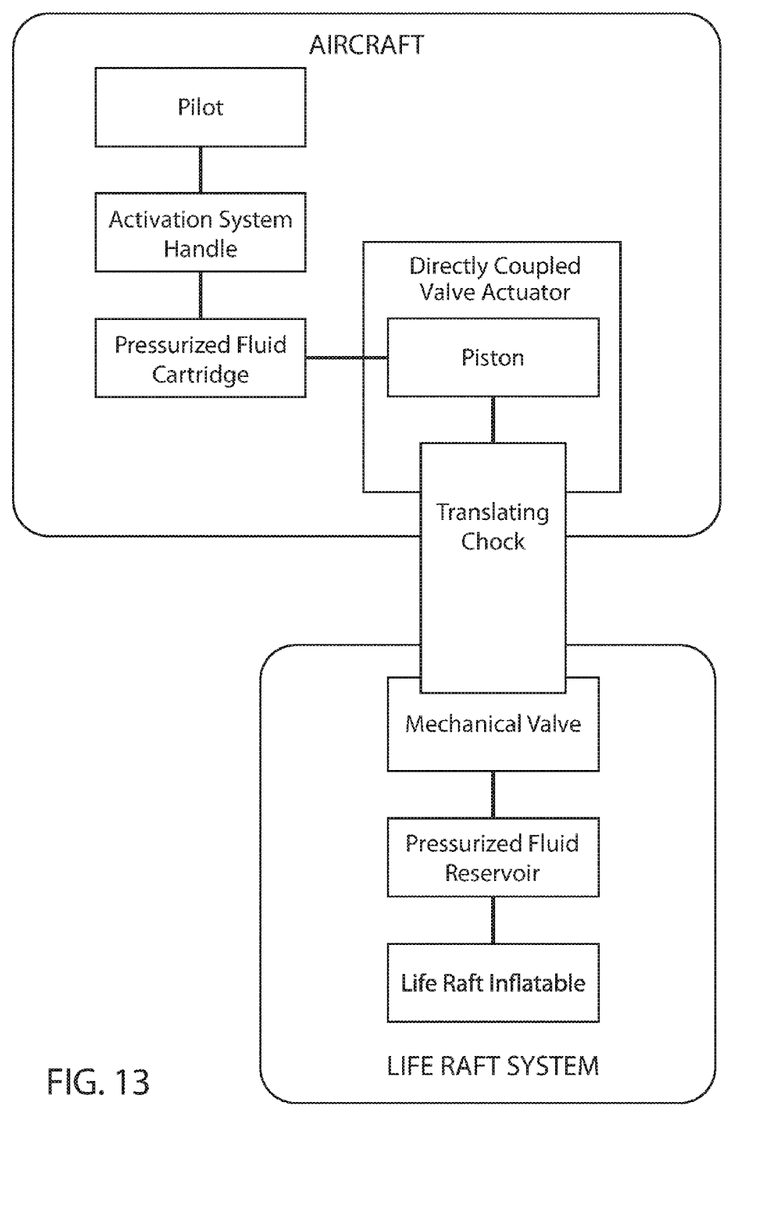
FIG. 13 shows a schematic flow chart of an activation sequence and a connection flow between elements, prior to activation.
Figure 14:
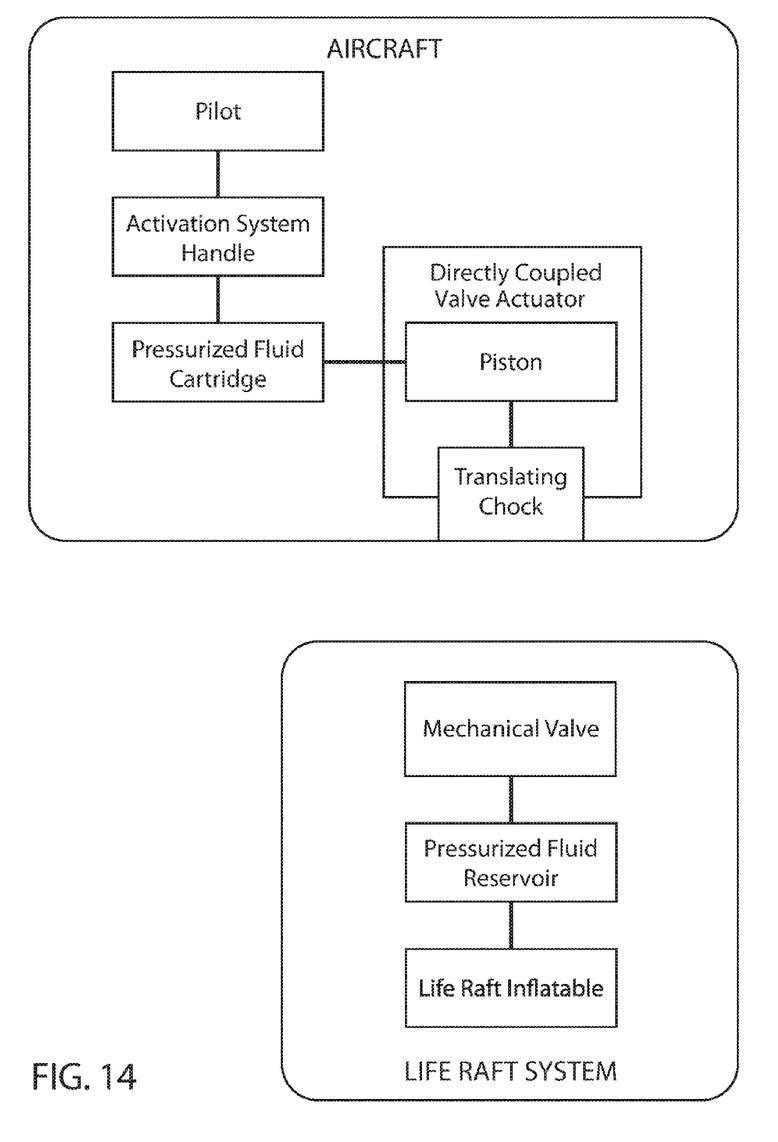
FIG. 14 shows a schematic flow chart of an activation sequence and a connection flow between elements, subsequent to activation.

FIGS. 12-14 shows schematically what is occurring during this activation process. As illustrated by FIG. 12, initially a pilot or other crewmember activates the activation system (block 1). This activation causes gas of a pressurized fluid cartridge to release pressurized fluid (block 2). The pressurized fluid flows through tubing to activate the piston of the directly coupled valve actuator 12 (block 3). Movement of the piston converts pressure from the pressurized fluid into mechanical translation applied to the piston into the translating chock (block 4). Movement of the translating chock unpins the mechanical valve of the life raft system from the directly coupled valve actuator (block 5). FIG. 13 shows the coupled nature between the portions of the system located on the aircraft and the portions of the system located on the life raft system. The point at which the translating chock unpins from the mechanical valve is illustrated by FIG. 14. At this stage, the life raft system is free to disengage from the aircraft.

Unpinning of the mechanical valve from the valve actuator triggers gas to release from the inflatable pressurized fluid reservoir (block 6). Pressurized fluid from the inflatable pressurized fluid reservoir flows through the mechanical valve and into the life raft inflatable, inflating the life raft for use (block 7).

Alternatively, it is possible to actuate the actuator system 10 by application of mechanical force to the translating chock 28. This is a secondary way to activate the system in the event that the pressurized fluid/piston option is unavailable. This redundancy may be provided for safety reasons, in the event that the fluid cartridge 110 does not work or if someone other than the pilot (or other crewmember who has access to the relevant control panel) needs to activate the system. For example, the mechanical force may be applied by a tether 44, a cable, or any other appropriate force. This similarly causes movement of the translating chock 28.

Figure 7:
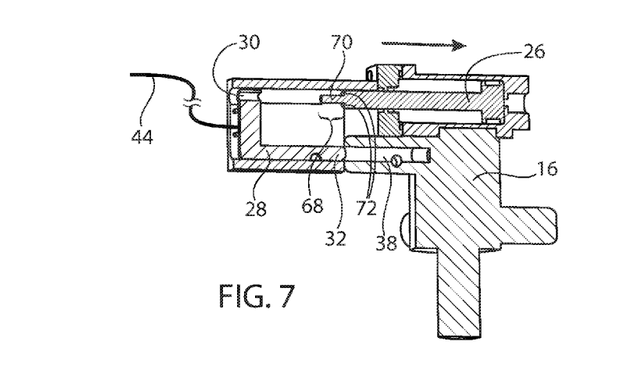
FIG. 7 shows a side cross-sectional view of the valve system of FIG. 5 upon a manual actuation of the translating chock.

In this manual embodiment, as illustrated by FIG. 7, the actuator piston 26 remains in its non-actuated state. This optional co-operable movement is due to the piston end 68 having a tip 70 and a shoulder 72. The piston tip 70 extends through and into an opening 30 on the chock 28 that is sized to receive the piston tip 70. The piston shoulder 72 is sized to be larger than the opening 30, such that when piston is forced in the direction of the arrow on FIG. 6, the shoulder 72 abuts the chock 28 and forces its movement in the same direction. However, if a separate mechanical force is applied to the chock 28, the chock 28 slides away from the piston in the direction of arrow on FIG. 7, but the actuator piston 26 remains unmoved. In FIG. 7, upon completion of travel of the translating chock 28, the valve 16 is similarly decoupled from the valve actuator 12 and is free to separate.

Figure 9:
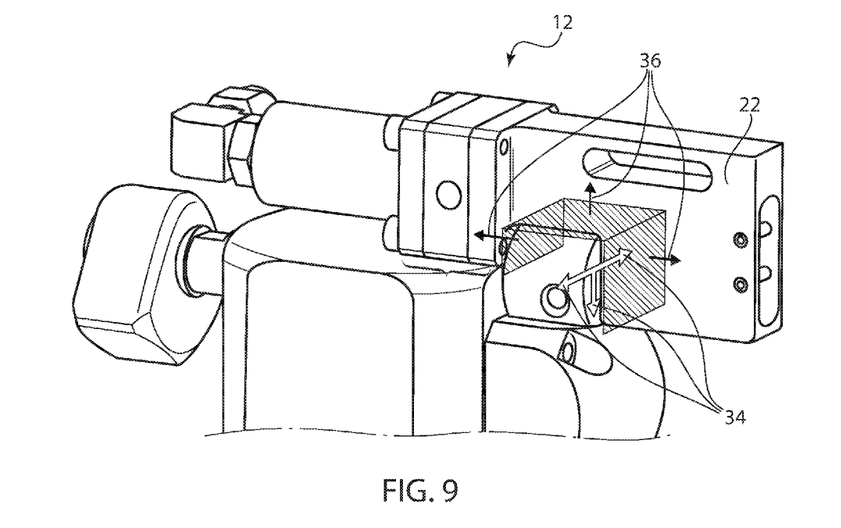
FIG. 9 shows a side perspective view of FIG. 8 with the chock translated.

FIGS. 8 and 9 illustrate one example of the rigidity and secure positioning provided by the valve actuator 12. These figures illustrate the relative degrees of freedom prior to and subsequent to actuation between the actuator and the valve. FIG. 8 illustrates the degrees of freedom between the actuator and valve in a secured/coupled state. FIG. 9 illustrates the degrees of freedom between the actuator and the valve when the chock is translated out of the valve.

Prior to actuation, the system is fully constrained and no motion (or rotation) is allowed between the valve and actuator 12. The rigid translating chock 28 (and the chock end 32, illustrated by the cut-away view in FIG. 8) is enclosed on all sides except for the sides previously constrained by the actuator housing. No motion is allowed in the direction of arrows 36 on FIG. 8. The valve is pinned from motion with respect to the directly coupled valve actuator 12 in all directions (except for the translating chock direction). The result is that the valve is locked from motion due to cooperating contact of the surfaces between the valve and the actuator 12. Subsequent to actuation, after the chock has translated as described, activating the valve, the restrictions of the translating chock (as shown by arrows 34 on FIG. 9) are removed, leaving only the arrow 36 restrictions present (shown as arrows 36), due to the actuator housing. The directions 36 that were previously pinned from motion are now freed. The cooperating surfaces between the valve and the valve actuator 12 are insufficient to restrain the valve. This allows the valve to readily separate from the valve actuator.

Other variations of this design are possible and considered within the scope of this disclosure. The general concept is that the valve remains fully constrained prior to actuation and only partially constrained after the actuation process.

The valve's degrees of freedom with respect to the actuator housing 22 is thus restricted by the rigid translating chock 28. The rigid translating chock 28 replaces the function of the valve's typically-used mechanical pull cable. The translating chock 28 will remain fixed in place until it is acted upon by the actuator piston 26 within the actuator housing 22. When the valve and valve actuator cooperate as described, the arrangement removes any freedom of relative motion between the valve and the valve actuator. This configuration can avoid the need for an external support structure. This can consequently result in an easier and more streamlined packing of the inflatable structure.

Regardless of whether the translating chock 28 is activated by movement of the actuator piston 26 or is acted upon by a manually operated tether, once acted upon, the translating chock 28 will translate out of the valve 14, thereby causing inflation of the life raft. This movement simultaneously removes the restrictions of motion between the parts and allows the valve 14 to easily slide out and away from the actuator housing 22.

It should be understood that the examples provided above are only possible utilizations of the present disclosure, and many alternatives and permutations may be realized depending on the specific valve to be interfaced to and other size and shape constraints that may be inherent to solving a designer's specific end-use application. For instance, in some cases it may be advantageous for the piston rod and rigid translating chock to be combined into a single component. Another potential variant may employ reversing the motion of the piston rod and have the chock attached to the piston via a pivoting lever or similar mechanism. Another potential variation may rotate the position of the valve actuator with respect to the valve.

The present disclosure can be adapted to most mechanically activated valves with appropriate skill of the designer to accommodate the specific valve's contours and features. The present disclosure offers advantages for inflatable structures that are activated by pneumatics or other pressurized fluid filled tubing. The disclosure allows for simplifying design considerations of the related supporting structures because rigid members that would normally be required to maintain the positions of the valve and pneumatic components can be eliminated. This can provide effective design solutions that are lighter, less expensive, and easier to maintain and assemble compared to solutions which do not employ the present invention.

Changes and modifications, additions and deletions may be made to the structures and methods recited above and shown in the drawings without departing from the scope or spirit of the disclosure or the following claims.

What is claimed is:

1. A valve actuator for use with an inflatable structure, comprising:
   an actuator fluid inlet,
   an actuator housing,
   a piston positioned within the actuator housing and capable of slidable movement within the housing upon application of pressurized fluid to the actuator fluid inlet, a translating chock operably associated with the piston, such that translation of the piston causes corresponding translation of the translating chock, wherein the translating chock further comprises an end configured to cooperate with and secure with respect to a valve of the inflatable structure, wherein displacement of the translating chock simultaneously (a) activates inflation of the inflatable structure via a separate, dedicated inflation source and (b) decouples the valve actuator from the valve of the inflatable structure such that the inflatable structure separates from the valve actuator while being inflated.

2. The valve actuator of claim 1, further comprising a manual activation system associated with the chock.

3. The valve actuator of claim 1, wherein the piston comprises a piston end comprising a tip and a shoulder, and wherein the chock comprises an opening that receives the piston tip.

4. The valve actuator of claim 1, further comprising one or more of stops to limit dislocation of the translating chock from the actuator housing.

5. The valve actuator of claim 1, further comprising a tether attachment slot.

6. The valve actuator of claim 1, wherein the actuator housing further comprises a piston housing element.

7. The valve actuator of claim 1, further comprising pressurized fluid tubing fluidly coupling the valve actuator with a pressurized fluid cartridge.

8. The valve actuator of claim 1, wherein a first flow of pressurized fluid causes movement of the piston and subsequent movement of the translating chock, and wherein a second flow of pressurized fluid from the separate dedicated inflation source causes inflation of the inflatable structure when the inflatable structure is detached from the valve actuator.

9. The valve actuator of claim 1, further comprising (i) a pressurized fluid cartridge associated with tubing leading to the actuator fluid inlet for activation of the valve actuator and (ii) a pressurized fluid reservoir associated with the inflatable structure, wherein upon activation of the valve actuator, the inflatable structure is decoupled from the valve actuator and inflated via the pressurized fluid reservoir.

10. A valve actuator, comprising:
a translating element that secures a valve actuator housing to a valve of an inflatable structure, wherein movement of the translating element is caused by application of pressurized fluid to the valve actuator housing, wherein the translating element comprises a first secured position in which the valve actuator housing and the valve of the inflatable structure are rigidly secured via the translating element,
wherein the translating element comprises a second position in which the valve actuator housing and the translating element are detached from the valve of the inflatable structure due to displacement of the translating element, the second position further causing (i) simultaneous inflation of the inflatable structure via a separate dedicated inflation source associated with the inflatable structure and (ii) detachment of the valve actuator housing from the inflatable structure.

11. A method for inflating a life raft or other inflatable structure to be removed from an activation source, comprising:
providing a translating element that secures a valve actuator housing to a valve of the inflatable structure, wherein movement of the translating element is caused by application of pressurized fluid to the valve actuator housing, wherein the translating element comprises a first secured position in which the valve actuator housing and the valve of the inflatable structure are rigidly secured via the translating element, and a second position in which the valve actuator housing and the translating element are detached from the valve of the inflatable structure due to displacement of the translating element, the second position further causing simultaneous inflation of the inflatable structure and detachment of the valve actuator housing from the inflatable structure;
activating the valve actuator, such that the translating element moves to the second position, detaching the valve actuator housing from the valve of the inflatable structure and causing inflation of the inflatable structure via a separate dedicated inflation source.

* * * * *